(12) United States Patent
Leyerle (10) Patent No.: US 8,138,897 B2
(45) Date of Patent: Mar. 20, 2012

(54) METHOD OF GENERATING VEHICLE NOISE

(75) Inventor: James W. Leyerle, Pleasant Ridge, MI (US)

(73) Assignee: General Motors LLC, Detroit, MI (US)

(*) Notice: Subject to any disclaimer, the term of this patent is extended or adjusted under 35 U.S.C. 154(b) by 455 days.

(21) Appl. No.: 12/399,663

(22) Filed: Mar. 6, 2009

(65) Prior Publication Data

US 2010/0228434 A1 Sep. 9, 2010

(51) Int. Cl.
*G08G 1/00* (2006.01)

(52) U.S. Cl. ..................... 340/425.5; 340/901

(58) Field of Classification Search ............ 340/901, 340/425.5, 436
See application file for complete search history.

(56) References Cited

U.S. PATENT DOCUMENTS

| | | | |
|---|---|---|---|
| 5,635,903 A | 6/1997 | Koike et al. | |
| 5,949,328 A * | 9/1999 | Latty | 340/326 |
| 6,897,781 B2 * | 5/2005 | Cooper et al. | 340/573.1 |
| 7,253,746 B2 * | 8/2007 | Maekawa et al. | 340/903 |
| 7,501,934 B2 * | 3/2009 | Tischer | 340/384.3 |
| 7,650,001 B2 * | 1/2010 | Yasushi et al. | 381/61 |
| 7,689,331 B2 * | 3/2010 | Moran | 701/22 |
| 7,755,472 B2 * | 7/2010 | Grossman | 340/426.1 |
| 7,812,740 B2 * | 10/2010 | Mergen | 340/904 |

* cited by examiner

*Primary Examiner* — Paul N Dickson
*Assistant Examiner* — Nicole Verley
(74) *Attorney, Agent, or Firm* — Dierker & Associates, P.C.

(57) ABSTRACT

A method of generating vehicle noise includes recognizing a geographic location requiring a minimum operating noise level of the vehicle, and notifying the telematics unit operatively associated with the vehicle that a then-current location of the vehicle coincides with the recognized geographic location. When the telematics unit is notified, the method further includes triggering a noise generator to generate an amount of noise external to the vehicle, where the generated noise is sufficient to reach the minimum operating noise level.

24 Claims, 3 Drawing Sheets

```
┌─────────────────────────────────────────────────────────┐
│ RECOGNIZING A GEOGRAPHIC LOCATION REQUIRING A          │──200
│ MINIMUM OPERATING NOISE LEVEL OF THE VEHICLE           │
└─────────────────────────────────────────────────────────┘
                              ↓
┌─────────────────────────────────────────────────────────┐
│ NOTIFYING A TELEMATICS UNIT THAT A THEN-CURRENT        │
│ LOCATION OF THE VEHICLE COINCIDES WITH THE             │──202
│ RECOGNIZED GEOGRAPHIC LOCATION                          │
└─────────────────────────────────────────────────────────┘
                              ↓
┌─────────────────────────────────────────────────────────┐
│ WHEN THE TELEMATICS UNIT IS NOTIFIED, TRIGGERING,      │
│ VIA THE TELEMATICS UNIT, A NOISE GENERATOR TO          │
│ GENERATE AN AMOUNT OF NOISE EXTERNAL TO THE            │──204
│ VEHICLE, THE GENERATED NOISE SUFFICIENT TO REACH       │
│ THE MINIMUM OPERATING NOISE LEVEL                       │
└─────────────────────────────────────────────────────────┘
```

METHOD OF GENERATING VEHICLE NOISE

TECHNICAL FIELD

The present disclosure relates generally to a method of generating vehicle noise.

BACKGROUND

Non-gasoline-powered vehicles, including hybrid vehicles operating in a non-gasoline-powered state, tend to produce significantly lower levels of operating noise (compared to gasoline-powered vehicles) when the vehicles are i) stopped, or ii) moving at relatively low speeds. Such lower operating noise levels may, in some instances, be undesirable. For example, a visually-impaired pedestrian who happens to be near the vehicle may not be aware of the vehicle's presence because he/she cannot hear the lower operating vehicle noise.

SUMMARY

A method of generating vehicle noise is disclosed herein. The method includes recognizing a geographic location requiring a minimum operating noise level of the vehicle and notifying a telematics unit operatively associated with the vehicle that a then-current location of the vehicle coincides with the recognized geographic location. When the telematics unit is notified, the method further includes triggering, via the telematics unit, a noise generator to generate an amount of noise external to the vehicle, where the generated noise is sufficient to reach the minimum operating noise level.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the method disclosed herein advantageously use a noise generator operatively associated with a non-gasoline-powered vehicle, including hybrid vehicles operating in a non-gasoline-powered state, to generate vehicle operating noise when the vehicle is i) stopped, or ii) moving at a relatively low speed. The generated noise may, for example, sound like an idling, gasoline-powered engine that, when heard, may apprise a pedestrian or other entity who/that is proximate to the vehicle that the vehicle is in fact nearby. The noise generator may advantageously be triggered by an in-vehicle telematics unit when the vehicle travels into geographic locations previously designated or recognized as requiring a minimum operating noise level. Furthermore, the generated operating noise may be tailored to different geographic locations requiring different minimum levels of vehicle operating noise. Generating the noise using the noise generator may also reduce in-vehicle levels of NVH (noise, vibration, and harshness) that may otherwise occur in instances where the noise is generated by alternative means. Yet further, less power may be expended by the vehicle for generating the noise using the noise generator, as compared to generating the noise using the alternative means.

It is to be understood that, as used herein, the term "user" includes vehicle owners, operators, and/or passengers. It is to be further understood that the term "user" may be used interchangeably with subscriber/service subscriber.

It is further to be understood that a "low speed" of the vehicle refers to a vehicle speed of up to about 5 mph. In an example, the low speed of the vehicle ranges from about 1 mph to about 3 mph. It is to be understood that the low speed of the vehicle may refer to instances where the vehicle is traveling at a constant low speed (such as when the vehicle is traveling along a road) or may refer to instances where the vehicle changes speed (such as when the vehicle is approaching a stop light). Additionally, when the vehicle is "stopped," the vehicle may still be operating in an "on" state; however the vehicle is not physically moving. A vehicle is "stopped," for example, when the vehicle transmission is set in a "drive" mode but the brake is fully applied by the vehicle operator.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be further understood that "communication" is to be construed to include all forms of communication, including direct and indirect communication. As such, indirect communication may include communication between two components with additional component(s) located therebetween.

Figure 1:
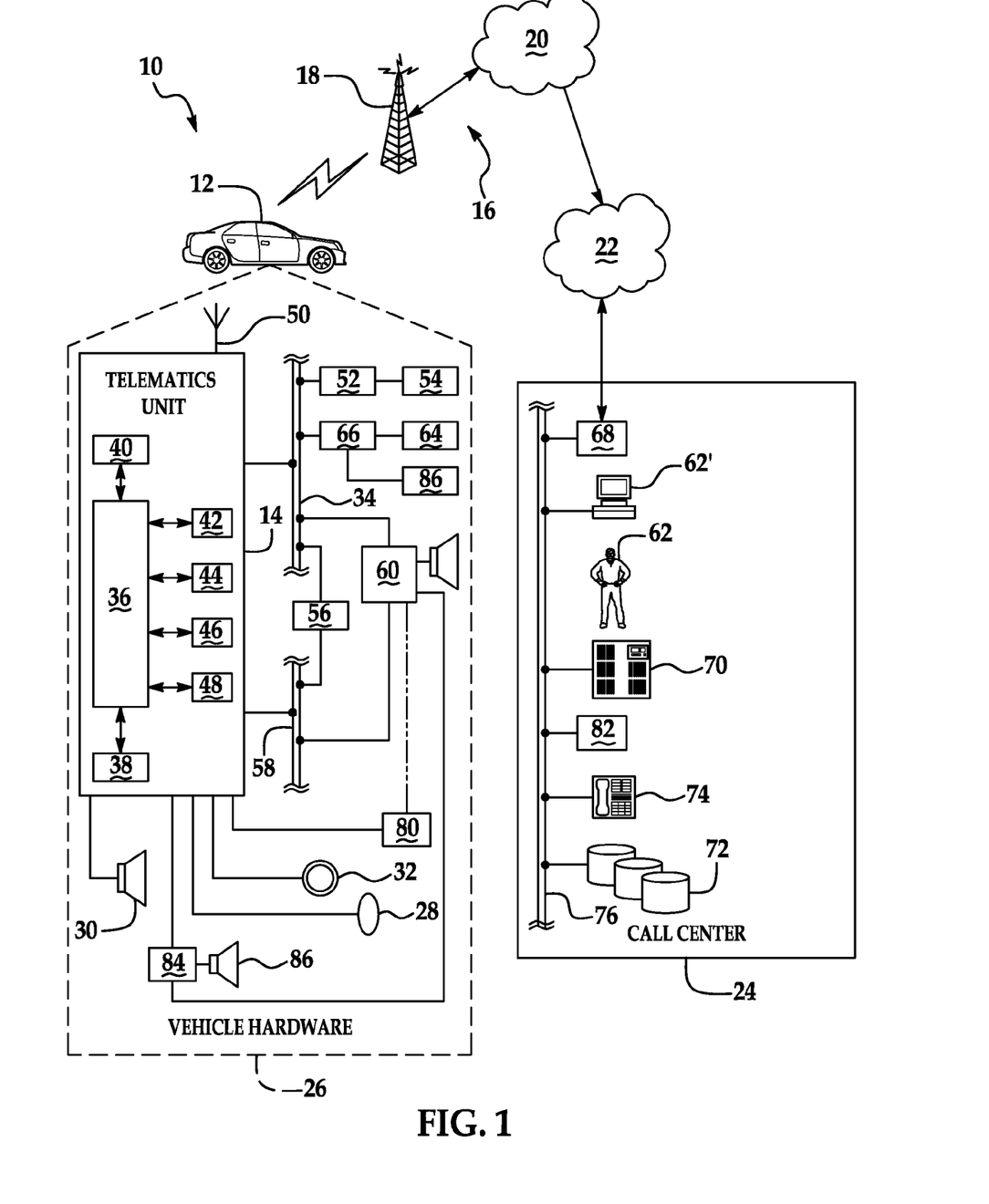
FIG. 1 is a schematic diagram depicting an example of a noise generating system.

Referring now to FIG. 1, the system 10 includes a vehicle 12, a telematics unit 14, a wireless carrier/communication system 16 (including, but not limited to, one or more cell towers 18, one or more base stations and/or mobile switching centers (MSCs) 20, and one or more service providers (not shown)), one or more land networks 22, and one or more call centers 24. In an example, the wireless carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 may be a non-gasoline powered vehicle, such as an electric vehicle, a vehicle powered by a fuel cell, a hydrogen-powered vehicle, or combinations thereof. The vehicle 12 may also be a hybrid vehicle, where the vehicle 12 includes a non-gasoline powered state. Furthermore, the vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include i) a microphone 28, ii) an internal speaker 30, and iii) buttons, knobs, switches, keyboards, and/or controls 32. One or more of these hardware 26 components enable a user to communicate with the telematics unit 14 and any other system 10 components in communication with the telematics unit 14.

In an example, the vehicle hardware 26 further includes a noise generator 84 in selective and operative communication with the telematics unit 14. The noise generator 84 may, for example, be any device capable of generating a desired amount of noise external to the vehicle 12. The noise generator 84 generates the noise when the telematics unit 14 is notified that a then-current location of the vehicle 12 coincides with a recognized geographic location. As used herein, a "recognized geographic location" may, in some instances, refer to a geographic location previously recognized or designated as requiring a minimum operating noise level of a vehicle similar to the vehicle 12. Also as used herein, the "recognized geographic location" may, in other instances, refer to a geographic location determined based on received data that a minimum operating noise level may be desirable. A "minimum operating noise level" generally refers to a predetermined noise level of the vehicle 12 based on a number of parameters including, but not limited to, i) a type of geographic location (e.g., urban, rural, etc.), ii) an existence of an accessible wireless network in the geographic location, iii) an existence of an inaccessible wireless network in the geographic location, iv) availability of a GPS satellite connection, v) strength of a wireless signal corresponding to the wireless network in the geographic location, and/or vi) a vehicle speed. The minimum operating noise level may, for instance, range from about 60 dB to about 80 dB depending on the foregoing parameters. In an example, if the then-current location of the vehicle 12 is an urban canyon area, an accessible wireless network system may be available and the strength of a wireless signal corresponding to the wireless network may be considered adequate, however no GPS satellite connection is available. Such locations may be considered to have a relatively noisy streetscape, thereby requiring a higher minimum operating noise level (such as, e.g., 80 dB). In another example, if the then-current location of the vehicle 12 is a suburban area, an accessible wireless network system may be available, the strength of the wireless signal may be adequate, and a GPS satellite connection may be available. In these suburban locations, a lower minimum noise level may be required (such as, e.g., 65 dB). In yet a further example, if the then-current location of the vehicle 12 is a rural area, an accessible wireless network system may not be available and no signal corresponding to the wireless network available, however a GPS satellite connection may be available. Such rural locations may be considered to be relatively quiet, thereby requiring an even lower minimum noise level (such as, e.g., 60 dB). In any event, the noise generated by the noise generator 84 is desirably sufficient to reach the minimum operating noise level for recognized geographic locations.

The noise generator 84 may, for example, be operatively connected to a speaker system 86 for emitting the generated noise outside of the vehicle 12. Such noise is generally configured to be heard by an entity located outside of the vehicle 12. The noise emitted outside of the vehicle 12 may, for instance, sound like an idling gasoline-powered engine, or any other noise sufficient to apprise a person or entity proximate the vehicle 12 that the vehicle 12 is near. In some instances, the generated noise may include a string of spoken words such as, e.g., "vehicle present!" or the like. In other instances, the generated noise may correspond to a particular musical tune or expression, a sound (such as a beep), or other audible noise.

In another example, the noise generator 84 may be operatively connected to an in-vehicle audio system or component 60. In such instances, the noise generator 84 generates a noise internal to the vehicle 12, where the noise is configured to be played inside the vehicle 12 and heard by the vehicle operator while operating the vehicle 12. In this example, the generated noise may be any designated sound (e.g., a beep, a musical tune, etc.), a string of spoken words, or another sound capable of apprising the user of the vehicle 12 that the vehicle 12 has entered a geographic location recognized as requiring a minimum noise level. In instances when the generated noise is played through the in-vehicle audio component 60, automatic cancellation (e.g., muting) of other sounds (such as, e.g., music emitted from an in-vehicle radio system) may occur while the generated noise is played inside the vehicle 12. The automatic cancellation of the other noise inside the vehicle 12 may, for example, occur for a predetermined amount of time in order to apprise the vehicle driver that he/she has entered a geographic location requiring a minimum noise level. The automatic cancellation of the other noise may, in another example, occur so long as the vehicle 12 is traveling within a bounded area surrounding the geographic location. In the latter example and in some instances, the automatic cancellation of the in-vehicle sounds may be overridden by the vehicle driver once the vehicle driver is aware of the fact that he/she has entered the geographic location requiring the minimum noise level. The audio system or component 60 will be described in further detail below.

Also operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual mode antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection component 44 may be used to determine a location of the vehicle 12 so that the telematics unit 14 and/or the call center 24 may determine if the vehicle 12 has entered a recognized geographic location requiring a minimum operating noise level of the vehicle 12.

The cellular chipset/component 40 may be an analog, digital, dual-mode, dual-band, multi-mode and/or multi-band cellular phone. The cellular chipset-component 40 uses one or more prescribed frequencies in the 450 MHz, 800 MHz analog band or in the 800 MHz, 900 MHz, 1800 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be a short-range wireless communication technology, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. For example, the telematics unit 14 may also be configured to trigger the noise generator 84 to generate an amount of noise corresponding with the predetermined decibel level of the recognized geographic location that the vehicle 12 is currently located.

Vehicle communications generally utilize radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error rate may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 is also in operative communication with the telematics unit 14 via the vehicle bus 34. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58. To reiterate from above, the audio component 60 may be configured to play noise generated by the noise generator inside the vehicle 12.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. Non-limiting example sensor interface modules 66 include powertrain control, climate control, body control, and/or the like.

In a non-limiting example, the vehicle hardware 26 includes a display 80, which may be operatively directly connected to the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions and, according to the example shown here, generally includes one or more switches 68, servers 70, databases 72, live and/or automated advisors 62, 62', as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

In an example, the call center 24 may be configured to provide, to the telematics unit 14 of the vehicle 12, one or more recognized geographic locations requiring a minimum noise level. In some instances, the recognized geographic locations provided to the telematics unit 14 are accompanied with the actual minimum noise levels. The call center 24, for example, provides such geographic locations (and minimum noise levels) to the telematics unit 14 in real time. Examples of the methods employed by the call center 24 to provide, to the telematics unit 14, the recognized geographic locations and the minimum noise levels will be described in further detail below.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

A cellular service provider generally owns and/or operates the wireless carrier/communication system 16. It is to be understood that, although the cellular service provider (not shown) may be located at the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide various service(s) to the user.

Figure 2:
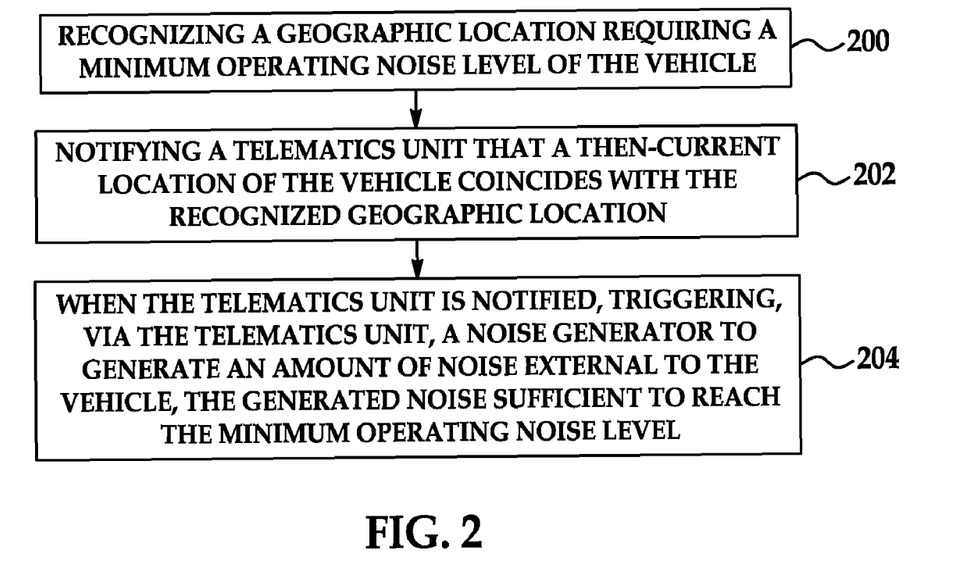
FIG. 2 is a flow diagram depicting an example of a method of generating vehicle noise.

An example of a method of generating vehicle noise 12 is depicted in FIG. 2. The method includes recognizing a geographic location requiring a minimum operating noise level of the vehicle 12 (as shown by reference numeral 200), and notifying the telematics unit 14 that a then-current location of the vehicle 12 coincides with the recognized geographic location (as shown by reference numeral 202). When the telematics unit 14 is notified, the method further includes triggering, via the telematics unit 14, the noise generator 84 to generate an amount of noise external to the vehicle 12 (as shown by reference numeral 204).

Figure 3:
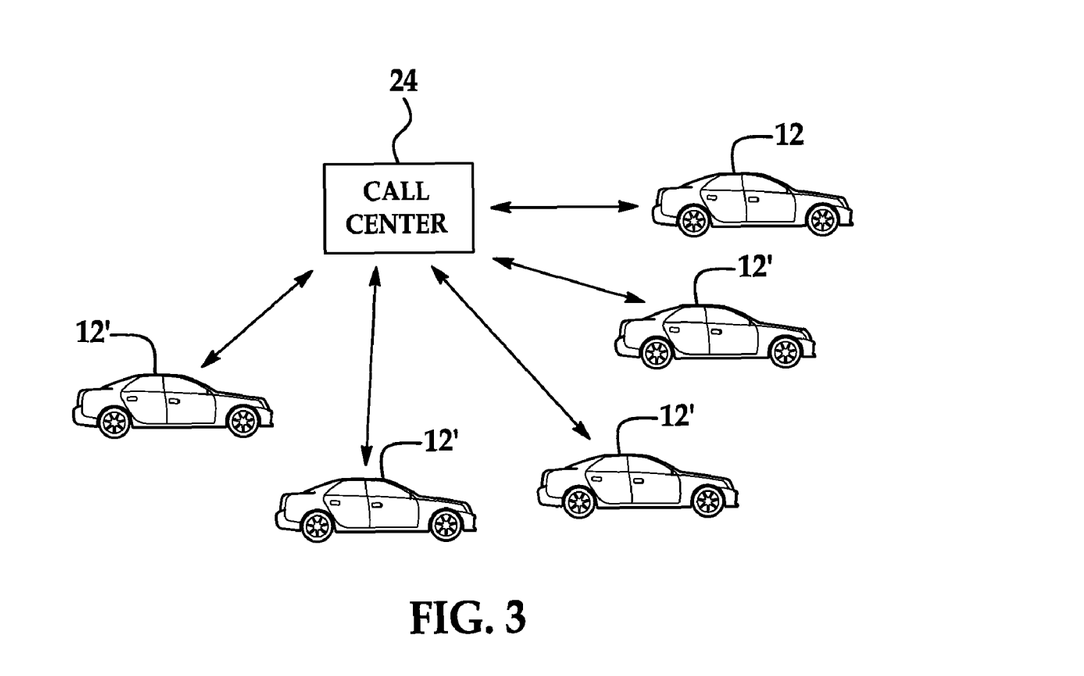
FIG. 3 is a schematic diagram of an example of a system for determining a recognized geographic location requiring a minimum noise level.
Figure 4:
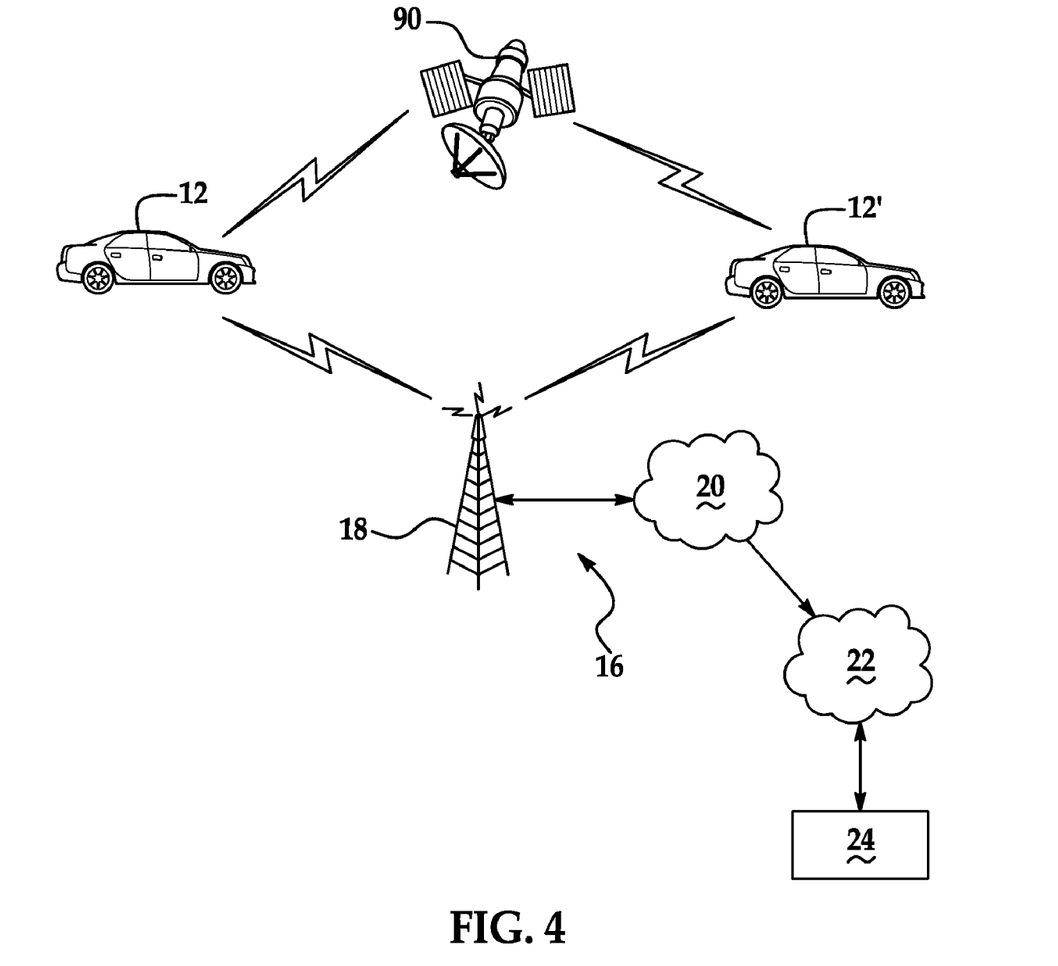
FIG. 4 is a schematic diagram of another example of a system for determining a recognized geographic location requiring a minimum noise level.

Several examples of recognizing the geographic location requiring a minimum noise level and notifying the telematics unit 14 are described herein in conjunction with FIGS. 2-4. One example of recognizing the geographic location requiring a minimum operating noise level of the vehicle 12 includes identifying the geographic location from a planned route downloaded to the telematics unit 14 from the call center 24. The planned route for a particular destination may be generated by the call center 24 upon request by the vehicle 12 user. The generated planned route includes, for example, i) a navigation route for the requested destination, and ii) one or more geographic locations recognized as requiring a minimum operating noise level. The recognized geographic location(s) (if any are present) are flagged on the planned route.

It is to be understood that the recognized geographic location(s) may be retrieved from a database of predetermined stored locations at the call center 24. The stored locations may be originated from a prescribed list obtained from, e.g., local traffic authorities, government officials (e.g., federal, state, or local), and/or other persons, entities, groups, associations, or the like that are responsible for setting the minimum vehicle operating noise levels. In an example, the stored locations may be originally obtained, by the call center 24, directly from the local traffic authorities and/or government officials. In another embodiment, the locations may otherwise be originally obtained from a government website posting such information, where the government website is accessible by the call center 24.

The database of the predetermined stored locations is periodically updated (e.g., every day, every month, etc.) from the prescribed list mentioned above. It is to be understood that at least some of the recognized geographic locations may not be determined by local traffic authorities, government officials, and/or the like. In some instances, the stored locations may be obtained from one or more residents of a particular location who submits, to the call center 24, the fact that one or more persons residing at his/her residence has some type of disability (e.g., a person who is visually impaired). In this example, a minimum vehicle operating noise level would be required at or within a bounded area surrounding the location of the person's residence. It is to be understood that the call center 24 may also obtain locations from workplaces, schools, parks, etc., where one or more persons that work, attend, and/or visit such places is/are disabled. A minimum vehicle noise level would also be required at such locations.

The location may not previously be stored, but may otherwise be obtained, by the call center 24, from one or more other vehicles 12' in real time (as shown in FIG. 3). In this case, the call center 24 is in operative communication with the other vehicle(s) 12' via a wireless carrier/communication system 16 (not shown in FIG. 3). For example, the call center 24 may be configured to ping one or more of the other vehicles 12' for geographic location data. Non-limiting examples of geographic location data may include a then-current location of the other vehicle(s) 12', a then-current amount of pedestrians near the other vehicle(s) 12', a then-current traffic level, a then-current noise level of the other vehicle(s) 12', and/or the like. The call center 24 thereafter uses the location data to determine one or more recognized geographic locations. In another example, the call center 24 may be configured to ping one or more of the other vehicles 12' for the actual recognized geographic locations (e.g., stored within the vehicle 12') requiring a minimum noise level and for the minimum noise level of each location, if one is available.

It is to be understood that, in some cases, some of the information stored in the database 72 may be outdated, which may be due, at least in part, to a lag in obtaining then-current geographic location information from, e.g., traffic authorities, government officials, etc. In such instances, the call center 24 may i) submit a request for updated information from, e.g., the government officials, etc., and/or ii) ping one or more of the other vehicles 12' for updated information. The other vehicle(s) 12' may obtain the updated information from, for example, a data-feed from government officials or the like. The updated information may otherwise by obtained, by the other vehicle(s) 12', from other vehicles proximate thereto using a vehicle-to-vehicle (V2V) communication means, an adhoc network, or the like.

It is further to be understood that any of the geographic location information/data obtained, by the call center 24 from the vehicle 12 or the other vehicles 12', is stored in the database at the call center 24. As more and more information is obtained by the call center 24, the database of the information/data grows, thereby allowing the call center 24 to have access to as much geographic location information as possible to suitably alert subscriber vehicles of recognized geographic locations and corresponding minimum noise levels. In some instances, it may be desirable to configure all of the subscriber vehicles 12 to automatically send geographic location information to the call center 24; rather than pinging the vehicle(s) 12, 12' individually for such information. The automatic sending may be accomplished periodically based on a predetermined time interval (e.g., every hour, every day, every first day of the month, etc.). The automatic sending may also be accomplished in response to a trigger, such as when the vehicle(s) 12, 12' enter a recognized geographic location.

Referring back to the example of recognizing the geographic locations along a planned route, the planned route (including the flagged geographic location(s)) may be downloaded from the call center 24 to the telematics unit 14. In an example, the planned route may be displayed to the user on the display unit 80, audibly provided to the user via the audio component 60, or combinations thereof It is to be understood that the flagged geographic location(s) is also be displayed to the user and/or audibly provided to the user along with the planned route.

In some instances, the planned route may include a single recognized geographic location requiring a minimum noise level. In other instances, the planned route may include a number of recognized geographic locations. It is to be understood that in such instances, each recognized geographic location includes its own corresponding minimum noise level. In many cases, the minimum noise levels for the different recognized geographic locations are different. For example, if a planned route includes two recognized geographic locations, the first geographic location may require a minimum noise level of about 70 dB and the second geographic location may require a minimum noise level of about 80 dB.

While the vehicle 12 is traveling along to the planned route, the telematics unit 14, via appropriate software operated by the processing unit 36, substantially continuously compares a then-current location of the vehicle 12 (retrieved from the in-vehicle GPS component 44) with various locations along the planned route. The telematics unit 14 identifies when the then-current location of the vehicle 12 coincides with a flagged location. If, for example, the then-current location of the vehicle 12 does in fact coincide with the flagged geographic location, the telematics unit 14 is notified that the vehicle 12 has entered a recognized geographic location requiring a minimum noise level.

To reiterate from above, the call center 24 may obtain location data collected from at least one of the other vehicles 12' (as shown in FIG. 3). Instead of determining the geographic locations along a planned route, the call center 24 may otherwise use the data to recognize one or more geographic locations upon request from the telematics unit 14 whose vehicle 12 is not necessarily traveling along a planned route. For instance, in response to a request from the telematics unit 14, the call center 24 pings one or more other vehicles 12' for data related to one or more geographic locations requiring minimum noise levels. In this instance, the request includes the then-current location of the vehicle 12 determined from the in-vehicle GPS component 44. It is to be understood that the other vehicles 12' pinged by the call center 24 are selected from those that are i) proximate to the vehicle 12, ii) traveling along the same road segment as the vehicle 12, or iii) traveling along substantially the same navigation route as the vehicle 12. Using appropriate software and/or programs, the call center 24 determines, from the information retrieved from the other vehicles 12', i) the coordinates of the recognized geographic location, and ii) the minimum noise level corresponding to the recognized geographic location.

In an example, the call center 24 transmits, to the telematics unit 14, the recognized geographic location and the minimum noise level based, at least in part, on the data collected from the other vehicle(s) 12'. The transmitting of the geographic location may be accomplished, for example, in real time upon receiving the request from the telematics unit 14. In another example, the call center 24 waits until the then-current location of the vehicle 12 coincides with a recognized geographic location or until the then-current location of the vehicle 12 is proximate to a recognized geographic location, and then transmits the recognized geographic location and corresponding minimum noise level to the vehicle 12. In this example, the telematics unit 14 periodically transmits its then-current location to the call center 24 so that the call center 24 can make the determination.

In some instances, the transmitting of the recognized geographic location may be accomplished prior to when the then-current location of the vehicle coincides with the recognized geographic location. In such instances, the transmitted recognized geographic location may be stored in the memory 38 operatively associated with the telematics unit 14. The telematics unit 14 is equipped with appropriate software configured to compare the then-current location of the vehicle 12 with the stored recognized geographic location and determine if and when the vehicle 12 has entered the recognized geographic location. The telematics unit 14 is notified that the then-current location of the vehicle 12 coincides with the recognized geographic location if the comparison results in a match.

In still another example, as shown in FIG. 4, the geographic location may be recognized by another vehicle 12', which broadcasts the recognized geographic location to the vehicle 12. For example, if five vehicles are traveling along a particular road segment within a predefined boundary, and two of the vehicles have data recognizing that the then-current location of the vehicles is a recognized geographic location, the two vehicles having such information broadcast the information to the other three vehicles that do not have such information. The broadcasting allows the two vehicles having the information to apprise the other three vehicles of the same information without the other three vehicles contacting the call center 24. The broadcasting may be accomplished automatically as the vehicle having the information enters a recognized geographic location and may be accomplished via any suitable wireless broadcast (via cell tower 18 or the wireless carrier system 16) and/or via a satellite broadcast using, e.g., a satellite 90.

In some instances, the broadcasting may be accomplished on demand via a request from another vehicle proximate to the vehicle 12. In such instances, the broadcasting may be accomplished using a vehicle-to-vehicle (V2V) communication system (now shown in the figures) operatively connected to the electronic processing device 36 of the telematics unit 14. The V2V communication system generally allows one vehicle (e.g., the vehicle 12 in FIG. 4) to wirelessly communicate with another vehicle (e.g., the vehicle 12') also having V2V communication capability when the two vehicles are in relatively close proximity of each other (i.e., within a range which enables a wireless connection to be made between the V2V communication systems, such as, e.g., up to about 700 m). The V2V communication system is used to communicate data (such as the geographic location and minimum noise level) to another vehicle within the communication range. For example, the vehicle 12, which includes the V2V communication system, can wirelessly communicate and/or exchange data with another mobile vehicle 12' via a V2V communication system if the vehicles 12 and 12' are within a suitable wireless connection range. It is to be understood that the vehicle 12 can communicate with a number of different vehicles also having V2V communication capabilities, if those vehicles are also within the V2V communication range.

It is to be understood that the recognized geographic location obtained from the other vehicle 12' via the broadcasting may, in some instances, also include the corresponding minimum noise level. In instances where the minimum noise level is not included with the broadcasted geographic location, the telematics unit 14 may request, from the call center 24, an appropriate minimum noise level for the broadcasted geographic location. In such instances, the telematics unit 14 transmits the broadcasted geographic location to the call center 24 and, in return, the call center 24 transmits the minimum noise level to the telematics unit 14.

The broadcasted recognized geographic location (and the minimum noise level, if one is provided) is stored in the memory 38 associated with the telematics unit 14 of the vehicle 12. In this example, the telematics unit 14, using appropriate software, compares a then-current location of the vehicle 12 with the broadcasted recognized geographic location stored in the memory 38. Notification occurs if the then-current location of the vehicle 12 matches the broadcasted recognized location.

In an example, the broadcasted information may also be uploaded to the call center 24 via a vehicle data upload. In instances where the call center 24 already includes such information, the call center 24 may i) use the broadcasted information to update the database 72, or ii) dispose of the broadcasted information. In instances where the call center 24 does not have such information, the broadcasted information is stored in the database 72.

In still a further example, the geographic location may be recognized by observing, via the vehicle operator while operating the vehicle 12, that the then-current location of the vehicle 12 coincides with the recognized geographic location. For instance, recognized geographic locations may be identified with appropriate signs or other suitable means placed along a road segment, which are configured to apprise vehicle operators that a minimum noise level is required. In an example, a sign may be placed at an intersection, and the sign may indicate that a minimum noise level is required at that intersection. The vehicle operator, upon observing the sign at the intersection, manually notifies the telematics unit 14 that the vehicle 12 is located in a recognized geographic location requiring a minimum noise level. Manual notification may be accomplished, for example, via a button press and/or a verbal utterance into the microphone 28 operatively associated with the telematics unit 14.

It is to be understood that some geographic locations recognized as requiring a minimum operating noise level may be temporary locations. Such temporary locations may accrue, for example, by an unexpected occurrence. For example, if a traffic report indicates the presence of a traffic jam on a particular road segment, the call center 24 may automatically transmit to the vehicle 12 the fact that the vehicle 12 is in a temporary recognized geographic location requiring a minimum noise level for the temporary location. In another example, the vehicle 12 may notify the call center 24 of the fact that the vehicle 12 is currently in a traffic jam. In response to the notification, the call center 24 may submit a minimum noise level for the vehicle 12.

In some instances, the minimum noise level for the temporary geographic location may be reduced based, at least in part, on the number of vehicles in, e.g., the traffic jam, etc. If, for example, the accumulation of the noise generated from all of the vehicles exceeds a predetermined maximum noise level, then the call center 24 may submit an instruction to the telematics unit of the subscriber vehicles 12 to i) generate noise according to the temporarily assigned reduced noise level, or ii) reduce the decibel level of the noise if the noise has already been generated.

A temporary location may also accrue in a location where a person with a temporary disability resides, works, or the like. In this case, the recognized geographic location will exist for the length of the disability and/or the length in which the person is present (e.g., living, working, etc.) in the area.

It is to be understood that, in any of the examples of recognizing the geographic location and notifying the telematics unit 14 provided hereinabove, after such notification, the telematics unit 14 may, in an example, submit location information corresponding to the recognized geographic location to the call center 24. In some instances, the transmission may be accompanied with a request for the minimum noise level corresponding to the recognized geographic location. The call center 24, in turn, retrieves the minimum noise level from i) a database storing the recognized geographic locations and corresponding noise levels, or ii) an other vehicle (such as the vehicle 12'). In an example, the call center 24 transmits the minimum noise level to the telematics unit 14.

Upon receiving the minimum noise level from the call center 24, the telematics unit 14 may, in an example, store the minimum noise level and its corresponding geographic location in a profile in the memory 38 associated with the telematics unit 14. The stored minimum noise level may be retrieved, by the telematics unit 14, from the profile the next time the vehicle 12 enters a recognized geographic location instead of requesting the minimum noise level from the call center 24. It is to be further understood that, in instances where a profile is used, the profile may automatically be updated by periodically transmitting an update from the call center 24 to the telematics unit 14. The update may be transmitted every day, every week, every month, or via a time interval pre-selected by the vehicle operator. The profile may otherwise be updated in response to a trigger, e.g., when the vehicle 12 enters a recognized geographic location. In this case, the updating may be accomplished prior to or after generating noise using the noise generator 84 (described further hereinbelow). If the updating occurs after generating the noise, the noise generator 84 applies the updated noise level (if different from before) while generating the noise.

In another example, the call center 24 downloads, to the telematics unit 14, a bounded area including the recognized geographic location and the minimum noise level corresponding with that location. The bounded area may be stored in the profile in the memory 38 of the telematics unit 14. When the telematics unit 14 determines that the then-current location of the vehicle 12 coincides with a recognized geographic location, the telematics unit 14 retrieves the information about the bounded area, including the minimum operating noise level.

After recognizing the geographic location requiring a minimum noise level and notifying the telematics unit 14 that the then-current location of the vehicle 12 coincides with the recognized geographic location, the telematics unit 14 triggers the noise generator 84 to generate a suitable amount of noise external to the vehicle 12. Triggering may be accomplished, for example, by transmitting a signal to the noise generator 84 to generate noise having a desired, predetermined decibel level (which corresponds with or is above the minimum required noise level). The generated noise is emitted through the speaker 86 external to the vehicle 12, apprising pedestrians and/or other entities that the vehicle 12 is near. In some instances, the generated noise is also emitted through the audio component 60 inside the vehicle, apprising the vehicle operator that he/she has entered a geographic location requiring a minimum noise level.

While several examples have been described in detail, it will be apparent to those skilled in the art that the disclosed examples may be modified. Therefore, the foregoing description is to be considered exemplary rather than limiting.

The invention claimed is:

1. A method of generating vehicle noise, the method comprising:
   via a call center, recognizing a geographic location requiring a minimum operating noise level of the vehicle;
   notifying a telematics unit operatively associated with the vehicle that a then-current location of the vehicle coincides with the recognized geographic location, the telematics unit being in selective and operative communication with the call center; and
   when the telematics unit is notified, triggering, via the telematics unit, a noise generator to generate an amount of noise external to the vehicle, the generated noise sufficient to reach the minimum operating noise level.

2. The method as defined in claim 1 wherein the recognizing of the geographic location and the notifying of the telematics unit includes:
   downloading a planned route from the call center to the telematics unit, the planned route including the recognized geographic location; and
   identifying, via the telematics unit, when the then-current location of the vehicle coincides with the recognized geographic location by comparing the then-current location of the vehicle with the planned route.

3. The method as defined in claim 2 wherein the planned route includes more than one recognized geographic location, and wherein each recognized geographic location includes its own corresponding minimum operating noise level of the vehicle.

4. A method of generating vehicle noise, comprising:
   recognizing a geographic location requiring a minimum operating noise level of the vehicle by determining, at a call center, the recognized geographic location using data collected from at least one other vehicle;
   transmitting, from the call center to the telematics unit, the recognized geographic location based on the collected data;
   notifying a telematics unit operatively associated with the vehicle that a then-current location of the vehicle coincides with the recognized geographic location; and
   when the telematics unit is notified, triggering, via the telematics unit, a noise generator to generate an amount of noise external to the vehicle, the generated noise sufficient to reach the minimum operating noise level.

5. The method as defined in claim 4 wherein the transmitting of the recognized geographic location is accomplished in real time when the then-current location of the vehicle coincides with the recognized geographic location.

6. The method as defined in claim 4 wherein the transmitting of the recognized geographic location is accomplished prior to when the then-current location of the vehicle coincides with the recognized geographic location, and wherein the method further comprises:
   storing the transmitted recognized geographic location in a memory operatively associated with the telematics unit; and
   retrieving the transmitted recognized geographic location from the memory when the then-current location of the vehicle coincides with the recognized geographic location.

7. The method as defined in claim 1 wherein the recognizing of the geographic location and the notifying of the telematics unit includes:
   observing, via a vehicle operator while operating the vehicle, that the then-current location of the vehicle coincides with the recognized geographic location; and
   manually notifying the telematics unit based on the observation.

8. The method as defined in claim 1 wherein after the notifying of the telematics unit, the method further comprises requesting and receiving, from the call center in selective and operative communication with the telematics unit, the minimum operating noise level corresponding to the recognized geographic location.

9. The method as defined in claim 8, further comprising automatically updating the received minimum operating noise level by periodically transmitting an update from the call center to the telematics unit.

10. The method as defined in claim 1 wherein after the notifying of the telematics unit, the method further comprises:
   requesting, from the call center in selective and operative communication with the telematics unit, the minimum operating noise level corresponding to the recognized geographic location;
   downloading, from the call center to the telematics unit, a bounded area including the geographic location requiring the minimum operating noise level; and
   retrieving, via the telematics unit, the minimum operating noise level from the downloaded bounded area when the then-current location of the vehicle coincides with the geographic location.

11. The method as defined in claim 1 wherein the amount of noise sufficient to reach the minimum operating noise level is further based on at least one of: a type of the geographic location; an existence of an accessible wireless network in the geographic location; an existence of an inaccessible wireless network in the geographic location; an availability of a GPS satellite connection; a strength of a wireless signal corresponding to the wireless network in the geographic location; or a vehicle speed.

12. The method as defined in claim 1 wherein the generated noise corresponds with a predetermined decibel level.

13. The method as defined by claim 1 wherein the generated noise external to the vehicle is configured to be heard by an entity located outside of the vehicle.

14. The method as defined in claim 1, further comprising generating a noise internal to the vehicle, the noise configured to be heard by a vehicle operator while operating the vehicle.

15. The method as defined in claim 1 wherein the vehicle is: i) fan electric vehicle, ii) a hybrid vehicle, iii) a vehicle powered by a fuel cell, iv) a hydrogen-powered vehicle, or v) combinations of i, ii, iii, and iv.

16. A noise generating system for a vehicle, the system comprising:
   a call center;
   a telematics unit in selective and operative communication with the call center, the telematics unit to receive, from the call center, one of i) a recognized geographic location retrieved from a database at the call center or ii) a planned route including the recognized geographic location, the recognized geographic location requiring a minimum operating noise level of the vehicle; and
   a noise generator in selective and operative communication with the telematics unit, the noise generator configured to generate an amount of noise external to the vehicle when the telematics unit is notified that the then-current location of the vehicle coincides with the recognized geographic location, wherein the generated noise is sufficient to reach the minimum operating noise level.

17. The noise generating system as defined in claim 16 wherein the call center is configured to download, to the telematics unit, the planned route including the recognized geographic location, and
   wherein the telematics unit identifies when the then-current location of the vehicle coincides with the recognized geographic location by comparing the then-current location of the vehicle with the planned route.

18. The noise generating system as defined in claim 16, further comprising any of a button or a microphone operatively associated with the telematics unit to
   actuate the telematics unit based on an observation that the then-current location of the vehicle coincides with the recognized geographic location.

19. The noise generating system as defined in claim 16 wherein the call center is further configured to i) provide, to the telematics unit, the minimum operating noise level corresponding to the recognized geographic location in real time, or ii) download, to the telematics unit, a bounded area including the geographic location requiring the minimum operating noise level for later retrieval by the telematics unit.

20. The noise generating system as defined in claim 16 wherein the noise generator is operatively connected to a speaker system configured to emit the generated noise outside the vehicle.

21. The noise generating system as defined in claim 16 wherein the noise generator is operatively connected to an audio system configured to play the generated noise inside the vehicle.

22. A method of generating vehicle noise, comprising:
   recognizing a geographic location by an other vehicle, the recognized geographic location requiring a minimum operating noise level of the vehicle;
   broadcasting the recognized geographic location to the vehicle;
   storing the broadcasted recognized geographic location in a memory operatively associated with a telematics unit operatively associated with the vehicle;
   identifying, via the telematics unit, when a then-current location of the vehicle coincides with the recognized geographic location by comparing the then-current location of the vehicle with the broadcasted recognized geographic location, thereby notifying the telematics unit that the then-current location of the vehicle coincides with the recognized geographic location; and
   when the telematics unit is notified, triggering, via the telematics unit, a noise generator to generate an amount of noise external to the vehicle, the generated noise sufficient to reach the minimum operating noise level.

23. A noise generating system for a vehicle, the system comprising:
   a call center;
   a telematics unit in selective and operative communication with the call center;
   a noise generator in selective and operative communication with the telematics unit, the noise generator configured to generate an amount of noise external to the vehicle when the telematics unit is notified that a then-current location of the vehicle coincides with a recognized geographic location requiring a minimum operating noise level of the vehicle, wherein the generated noise is sufficient to reach the minimum operating noise level; and
   at least one other vehicle configured to obtain data related to at least one geographic location, wherein the at least one geographic location is the recognized geographic location or an other geographic location;
   wherein the call center is in selective and operative communication with the other vehicle and with the telematics unit, the call center being configured to i) collect the data obtained by the at least one other vehicle, ii) determine that the at least one geographic location is a recognized geographic location using the collected data, and iii) determine the minimum operating noise level corresponding to the recognized geographic location;

and wherein the telematics unit is further configured to receive a transmission of the recognized geographic location and the minimum operating noise level from the call center.

24. A noise generating system for a vehicle, the system comprising:
a call center;
a telematics unit in selective and operative communication with the call center;
a noise generator in selective and operative communication with the telematics unit, the noise generator configured to generate an amount of noise external to the vehicle when the telematics unit is notified that a then-current location of the vehicle coincides with a recognized geographic location requiring a minimum operating noise level of the vehicle, wherein the generated noise is sufficient to reach the minimum operating noise level;
an other vehicle configured to recognize the geographic location, and to means broadcast the recognized geographic location to the vehicle; and
a memory operatively connected to the telematics unit of the vehicle, the memory configured to store the recognized geographic location;
wherein the telematics unit identifies when the then-current location of the vehicle coincides with the recognized geographic location by comparing the then-current location of the vehicle with the broadcasted recognized geographic location.

* * * * *